United States Patent
Harishankar et al.

(10) Patent No.: US 9,912,529 B2
(45) Date of Patent: Mar. 6, 2018

(54) TENANT-SPECIFIC LOG FOR EVENTS RELATED TO A CLOUD-BASED SERVICE

(71) Applicant: INTERNATIONAL BUSINESS MACHINES CORPORATION, Armonk, NY (US)

(72) Inventors: Raman Harishankar, Blacklick, OH (US); Cong-Tam N. Nguyen, San Francisco, CA (US); Gandhi Sivakumar, Bentleigh (AU); Vijayaganesh Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 14/464,378

(22) Filed: Aug. 20, 2014

(65) Prior Publication Data
US 2016/0056993 A1 Feb. 25, 2016

(51) Int. Cl.
H04L 12/24 (2006.01)
H04L 12/26 (2006.01)
H04L 29/08 (2006.01)

(52) U.S. Cl.
CPC ............ *H04L 41/069* (2013.01); *H04L 43/08* (2013.01); *H04L 67/22* (2013.01); *H04L 67/10* (2013.01)

(58) Field of Classification Search
CPC .. G06F 9/5061; G06F 11/3485; G06F 11/323; G06F 2209/508; G06F 2209/504;
(Continued)

(56) References Cited

U.S. PATENT DOCUMENTS 6,138,249 A 10/2000 Nolet
7,849,196 B2 12/2010 Gkantsidis et al.
(Continued)

OTHER PUBLICATIONS

Anonymous, "Overview of the Centralized Logging Service", technet.microsoft.com, Microsoft, Inc., last modified Feb. 22, 2013, retrieved Jun. 24, 2014, pp. 1-4.
(Continued)

*Primary Examiner* — Chris Parry
*Assistant Examiner* — Soe M Hlaing
(74) *Attorney, Agent, or Firm* — John R. Pivnichny; Law Office of Jim Boice

(57) ABSTRACT

A method, system, and/or computer program product establishes and utilizes a tenant-specific log for events related to a cloud-based service. A metamodel is created for a cloud-based service running on a cloud. The cloud-based service is provided to a specific tenant of the cloud, and the metamodel describes types of resources, on the cloud, that are providing the cloud-based service for the specific tenant. The metamodel is appended to the cloud-based service. In response to the cloud-based service being executed for the specific tenant of the cloud, the metamodel is used to identify a set of resources that are actually providing the cloud-based service for the specific tenant. A tenant-specific log for events related to the cloud-based service is established, where the tenant-specific log tracks events that occur on each actual resource on the cloud that provides the cloud-based service to the specific tenant. The tenant-specific log is then retrieved.

18 Claims, 5 Drawing Sheets

(58) Field of Classification Search
CPC . G06F 11/3442; Y02B 60/142; H04L 41/069; H04L 43/08; H04L 67/22; H04L 67/10
See application file for complete search history.

(56) References Cited

U.S. PATENT DOCUMENTS

| | | | |
|---|---|---|---|
| 8,271,804 | B2 | 9/2012 | Kudo |
| 9,268,789 | B1* | 2/2016 | Swerdlow ......... G06F 17/30082 |
| 2002/0116642 | A1 | 8/2002 | Joshi et al. |
| 2004/0167941 | A1* | 8/2004 | Prahlad ............. G06F 17/30067 |
| 2005/0138471 | A1 | 6/2005 | Okbay et al. |
| 2009/0265473 | A1 | 10/2009 | Hydrie et al. |
| 2011/0016214 | A1 | 1/2011 | Jackson |
| 2011/0131316 | A1 | 6/2011 | Ferris et al. |
| 2011/0131335 | A1 | 6/2011 | Spaltro et al. |
| 2011/0131499 | A1 | 6/2011 | Ferris et al. |
| 2011/0145836 | A1 | 6/2011 | Wheeler et al. |
| 2011/0167469 | A1 | 7/2011 | Letca et al. |
| 2011/0258621 | A1* | 10/2011 | Kern ..................... G06F 9/5072 718/1 |
| 2011/0289119 | A1 | 11/2011 | Hu et al. |
| 2012/0179646 | A1 | 7/2012 | Hinton et al. |
| 2012/0297452 | A1* | 11/2012 | Munetoh .............. G06F 21/554 726/3 |
| 2013/0007265 | A1* | 1/2013 | Benedetti ............ H04L 67/1097 709/224 |
| 2013/0036449 | A1 | 2/2013 | Mukkara et al. |
| 2013/0097296 | A1* | 4/2013 | Gehrmann ............ G06F 9/4856 709/223 |
| 2014/0196042 | A1* | 7/2014 | Nakata .................. G06F 9/4856 718/1 |
| 2015/0207703 | A1* | 7/2015 | Gallagher ........... G06F 11/3006 709/224 |

OTHER PUBLICATIONS

IBM Corporation, "IBM Tivoli Monitoring for Virtual Environments, Version 7.1", IBM Corporation, publib.boulder.ibm.com, 2012, pp. 1-2.

IBM Corporation, "IBM SmartCloud Analytics—Log Analysis", IBM Corporation, retrieved Aug. 20, 2014, pp. 1-2.

IBM Corporation, "Managing Multiple IBM Systems Director Servers Using Hierarchical Management", IBM Corporation, IBM Director v6.2.x, retrieved May 6, 2014, pp. 1-2.

R. Natale, "Development of a Standard Methodology for Converting SNMP MIBs to Resource Models for the SOA/ Web Services Management Environment (MIB2RMDL)", IETF, The 68th Internet Engineering Task Force, Mar. 21, 2007, Prague, Czech Republic, pp. 1-13.

EMC Solutions Group, "Virtualizing Microsoft Applications in a Multi-Tenancy Environment with VCE VBlock 1", EMC Corporation, White Paper, Feb. 2012, pp. 1-69.

K. Wilson, I. Sedukhin, Eds., "Web Services Distributed Management: Management of Web Services (WSDM-MOWS) 1.1" OASIS Web Services Distributed Management TC, OASIS Standard, Aug. 1, 2006, pp. 1-50.

K. Matsudaira, "Distributed Systems Basics—Handling Failure: Fault Tolerance and Monitoring", katemats.com, Nov. 13, 2011, pp. 1-6.

B. Darmawan et al., "IBM Tivoli Usage and Accounting Manager V7.1 Handbook", IBM Corporation, Redbooks, Mar. 2008, pp. 1-400.

* cited by examiner

1

TENANT-SPECIFIC LOG FOR EVENTS RELATED TO A CLOUD-BASED SERVICE

BACKGROUND

The present disclosure relates to the field of computers, and specifically to the use of cloud-based computers and the services they provide. Still more particularly, the present disclosure relates to tracking operations of cloud-based computers and other cloud-based resources.

Logging systems track events within resources. Examples of resources include hardware devices such as servers, communication devices, networks, storage drives, etc., as well as software resources such as operating systems and applications. Examples of events include the abnormal (e.g., overheating, over usage, inefficient operation), the normal (e.g., performing operations within predefined nominal parameters), the harmful (i.e., will cause the service to degrade or fail, even if the systems are operating with nominal parameters), and/or the harmless (i.e., even if nominal parameters are exceeded, the service will still be delivered without undue degradation).

SUMMARY

A method, system, and/or computer program product establishes and utilizes a tenant-specific log for events related to a cloud-based service. A metamodel is created for a cloud-based service running on a cloud. The cloud-based service is provided to a specific tenant of the cloud, and the metamodel describes types of resources, on the cloud, that are providing the cloud-based service for the specific tenant. The metamodel is appended to the cloud-based service. In response to the cloud-based service being executed for the specific tenant of the cloud, the metamodel is used to identify a set of resources that are actually providing the cloud-based service for the specific tenant. A tenant-specific log for events related to the cloud-based service is established, where the tenant-specific log tracks events that occur on each actual resource on the cloud that provides the cloud-based service to the specific tenant. The tenant-specific log is then retrieved.

DETAILED DESCRIPTION

Figure 1:
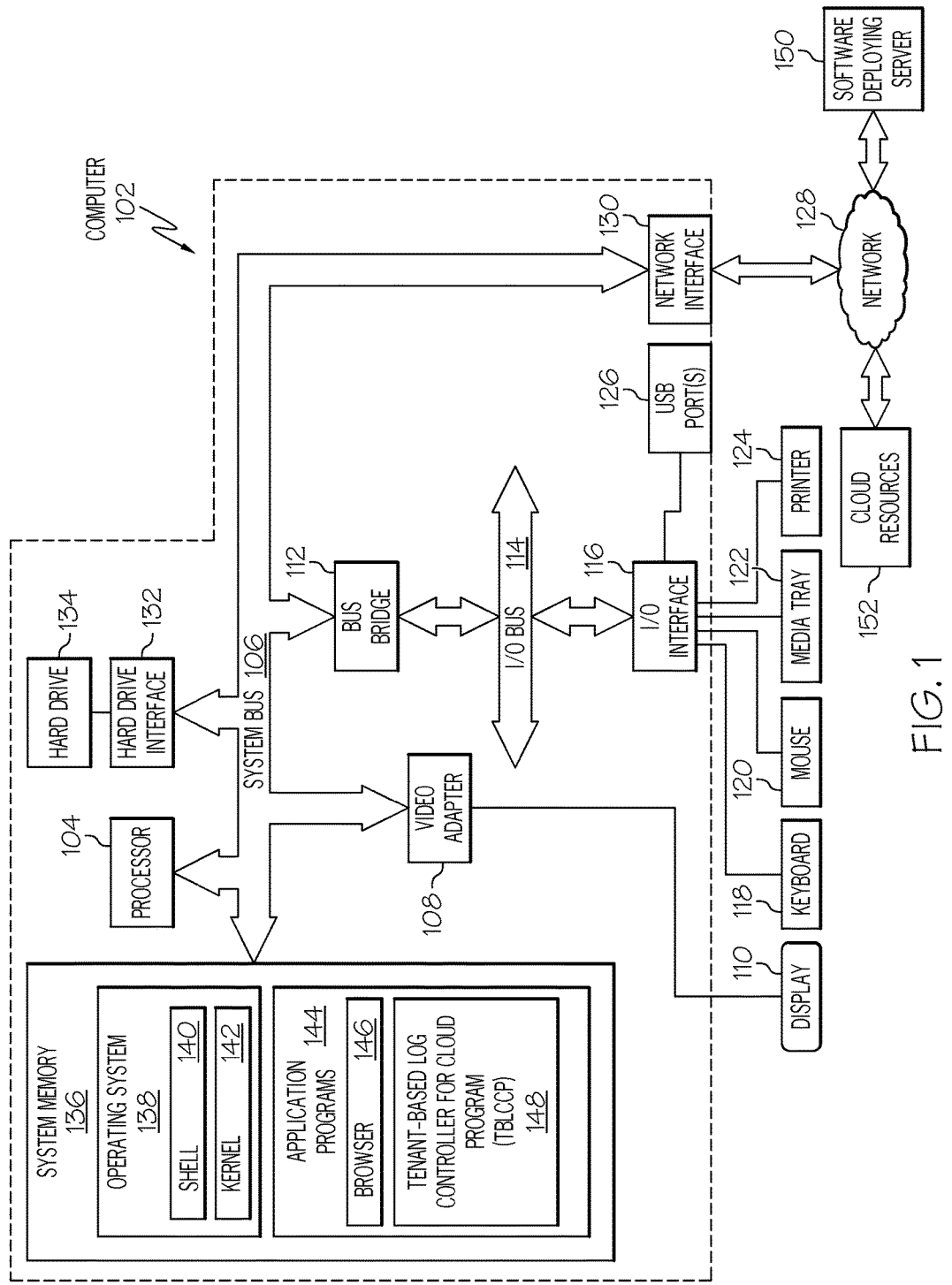
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or cloud resources 152 shown in FIG. 1, and/or cloud administrator 202 and/or service automation manager 204 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Tenant-Based Log Controller for Cloud Program (TBLCCP) 148. TBLCCP 148 includes code for implementing the processes described below, including those described in FIGS. 2-5. In one embodiment, computer 102 is able to download TBLCCP 148 from software deploying server 150, including in an on-demand basis, wherein the code in TBLCCP 148 is not downloaded until needed for execution. Note further that, in one embodiment of the present invention, software deploying server 150 performs all of the functions associated with the present invention (including execution of TBLCCP 148), thus freeing computer 102 from having to use its own internal computing resources to execute TBLCCP 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
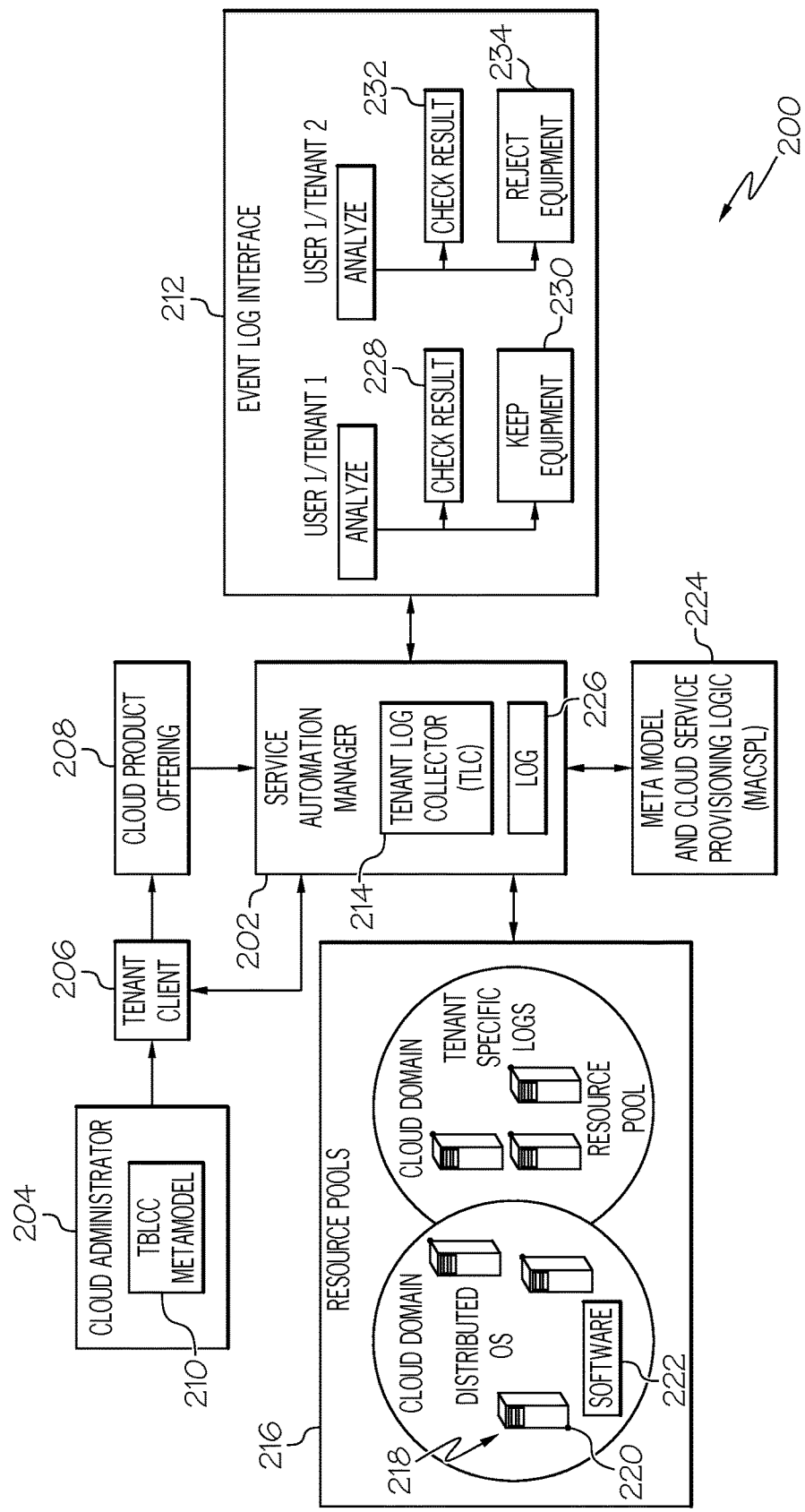
FIG. 2 illustrates an exemplary system in which the present invention may be implemented.

With reference now to FIG. 2, an exemplary system 200 in which the present invention may be implemented is presented. Note that in one or more embodiments, the present invention is implemented in the context of a "cloud". A "cloud" is defined as a distributed set of resources, which includes hardware, software, networks, communication links, and other information processing systems in a distributed, on-demand basis. That is, cloud computing (which utilizes a cloud) refers to a type of network computing in which programs not only run on networked servers which, in the prior art, were typically hidden from an end user, but also retrieve/use the programs themselves (as well as requisite data to run on the programs) from/at shared locations. Thus, multiple parties can share not only computing and storage hardware, but can also share the software (including operating systems and application programs) running on these computing and storage hardware. Thus, both the hardware and software are virtualized when viewed by the user of the cloud.

The shared hardware resources used in cloud computing are connected through communication networks that include, but are not limited to, a Local Area Network (LAN), a Wide Area Network (WAN), and the Internet. A LAN is a computer network that interconnects computers within a limited area, such as a campus of a company, a school, a home, etc. A WAN is a computer network that covers a much larger area, including cities, states, countries, and even the entire world. The Internet is similar to a WAN, but is actually an interconnection of networks, each of which have their own hardware resources.

Returning now to FIG. 2, a cloud administrator 204 configures tenants/users on a cloud (which in one embodiments includes all elements shown in FIG. 2) using a Business Process as a Service (BPaaS). BPaaS is a service that is delivered via a cloud (defined above). That is, a BPaaS delivers a cloud-based service (e.g., cloud-based bookkeeping, file storage, inventory management, scheduling, etc.) using distributed hardware and software resources that are accessible on-demand from a cloud.

As depicted in FIG. 2, a cloud administrator 204 configures a tenant client 206 to utilize a cloud product offering 208 by using a "Tenant Based Log Controller for Cloud" (TBLCC) MetaModel 210. That is, a cloud administrator 204 (e.g., a user of a computer such as computer 102 shown in FIG. 1) uses a BPaaS to configure a tenant client 206 to both access a cloud-based service and to configure that cloud-based service (in accordance with the present invention) to monitor/log events within that cloud-based service.

A "tenant" is defined as a customer/user of the cloud. Thus, tenant client 206 is a client device being used by a tenant of the cloud. The cloud administrator uses a BPaaS to configure a particular client device (e.g., tenant client 206) by 1) allowing the tenant client 206 to access a cloud product offering 208 (i.e., a cloud service provided by the cloud), 2) allowing a user of the tenant client 206 to define which logs he/she desired to track/log/monitor on the cloud, and 3) allowing a user to access an event log interface 212, which allows the user to both monitor and control usage of resources on the cloud.

A MetaModel (also referenced herein as a "meta model" and/or "metamodel") is defined as a description of the type(s) of resource(s) on a cloud that are providing the cloud-based service for the specific tenant and that the specific tenant desires to monitor. For example, a MetaModel may describe specific types of software applications, operating systems, processing devices (e.g., servers), storage devices (e.g., hard drives), communication systems (e.g., hardware interfaces such as network interface cards (NICs), communication lines (landline and wireless), application program interfaces (APIs) used to interface different software resources when providing a complete cloud-based service/solution, and other cloud-based hardware/software that is used to provide a specific cloud product offering 208 to the tenant client 206.

Figure 3:
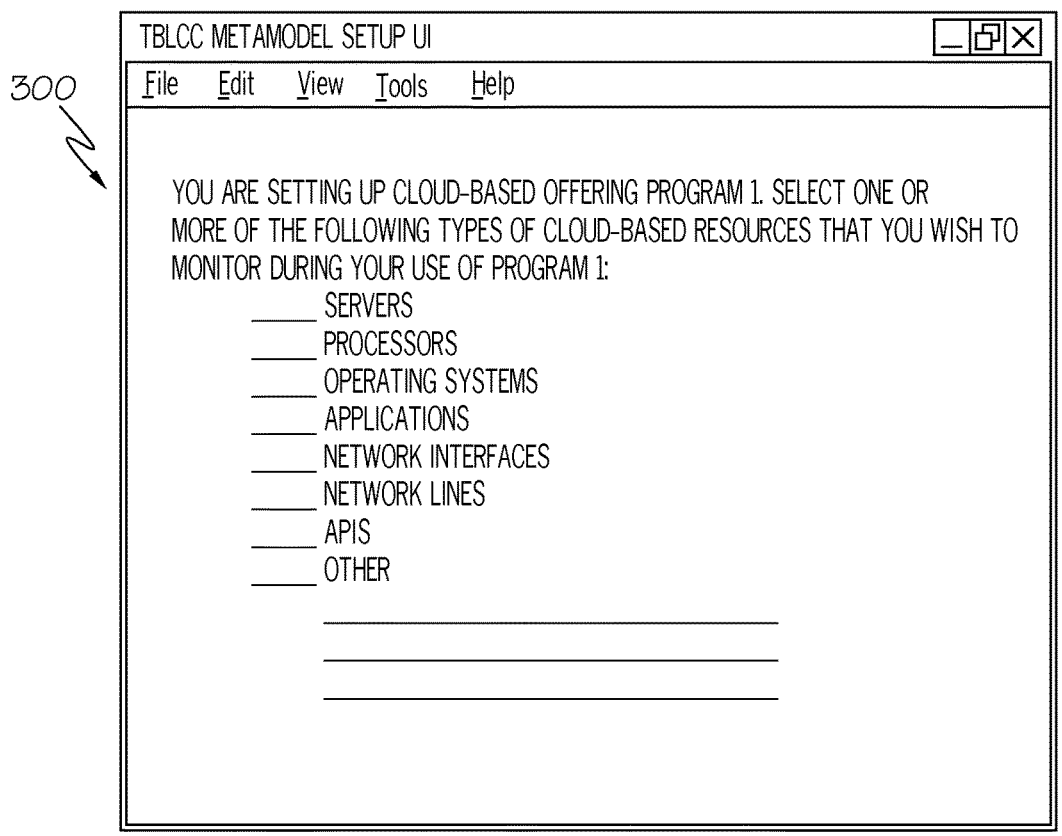
FIG. 3 depicts an exemplary user interface for a user to select which types of resources are to be monitored during the provision of a cloud-based offering/service.

In one embodiment, the service automation manager 202 and/or cloud administrator 204 determines which cloud-based resources will be monitored for a specific tenant client 206. In another embodiment, however, a user of the tenant client 206 will make this selection manually. For example, as shown in FIG. 3, a user may select one or more of the types of resources to be monitored (during the execution/provision of a particular cloud-based service such as "Program 1") from a user interface 300. Note that user interface 300 is set up using a "Tenant Based Log Controller for Cloud" (TBLCC), which in one embodiment is part of TBLCCP 148 shown in FIG. 1.

In one embodiment, setting up specific resources for monitoring results in disabling default log capabilities, either for the cloud product offering 208 (i.e., cloud-wide) or for specific resources used by the cloud product offering 208 (e.g., specific servers, programs, etc.). That is, if specific resources are configured for monitoring, then any default log capabilities are disabled automatically. Thus, the present invention provides a level of granularity that 1) give the user his desired information without 2) overwhelming the monitoring/logging processing for the cloud/resources.

Once a determination has been made as to which resources are to be monitored during the operation of the cloud-based offering 208, the service automation manager 202 launches a tenant log collector (TLC) 214. In one embodiment, a different TLC 214 is launched for each tenant/user (e.g., tenant client 206) that is configured to use a particular cloud product offering (e.g., cloud product offering 208). In another embodiment, a different TLC 214 is launched for each tenant/user (e.g., tenant client 206) without regard to which cloud product offering they are using.

The TLC 214 establishes which resources from resource pools 216 are to be traced for the tenant client 206 (either in an on-going manner or specifically for just the cloud offering 208). In one embodiment, a particular resource (e.g., server 218) has an on-board agent 220, which is a software agent that provides event information (related to the server 218) to the TLC 214. In the case of a hardware resource (such as server 218) being monitored, examples of events include, but are not limited to, processor usage levels (e.g., percentage of maximum capacity), storage usage (e.g., how often a storage device on the server 218 is accessed), storage performance (e.g., how long it takes to retrieve data from a particular storage device in the server 218), network bandwidth (i.e., how fast a network to the server 218 and/or network interface on the server 218 is), etc. In the case of a software resource being monitored (e.g., software 222 in resource pools 216), a software agent is appended to the software resource to track events such as page swaps (i.e., loading page(s) of data from a hard drive into system memory), execution of a particular sub-routine, errors during execution of the software 222 (e.g., due to unavailable data, a bug in the code, etc.), usage (e.g., if the software 222 is an API), etc.

In order to establish the TBLCC MetaModel 210 and to provision the cloud product offering 208, in one embodiment the service automation manager 202 utilizes a MetaModel and cloud service provisioning logic (MACSPL) 224, which in one embodiment is part of the TBLCCP 148 shown in FIG. 1. The MACSPL 224 performs the process depicted in FIG. 4.

Figure 4:
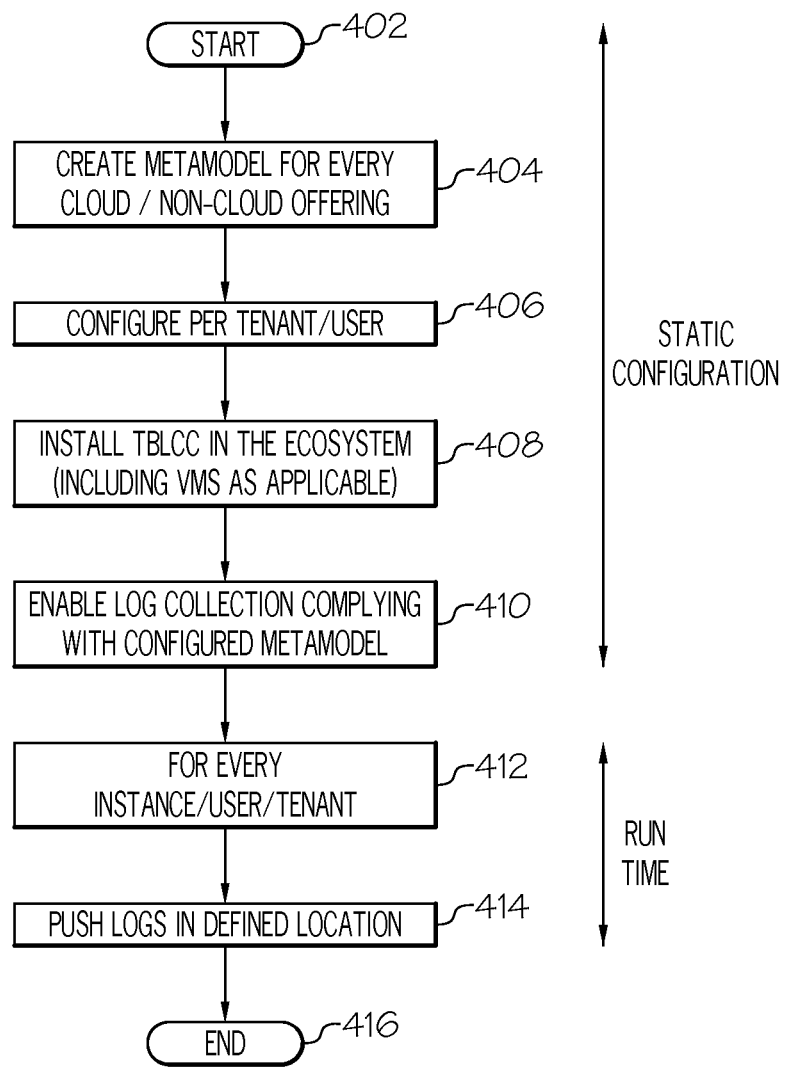
FIG. 4 is a high level flow-chart of one or more operations performed by one or more processors to provision a tenant-specific log of resources.

With reference now to FIG. 4, a high level flow-chart of one or more operations performed by one or more processors to provision a tenant-specific log of resources is presented. After initiator block 402, a MetaModel (described above) is created for every cloud offering (i.e., services, programs, storage, etc.), as described in block 404. In one embodiment, a MetaModel is also created for non-cloud (i.e., hosted on a local computer or otherwise non-distributed computing system) offerings.

As depicted in block 406, the MetaModel is then configured for each tenant/user. That is, the MetaModel is created in block 404 to define the types of resources that can be monitored, and in block 406 specific resources, appropriate for a particular tenant/user and the cloud services that it/he will be using, are then identified for monitoring.

As depicted in block 408, the "Tenant Based Log Controller for Cloud" (TBLCC), discussed above, is then installed in the ecosystem (i.e., the cloud). For example, the TBLCC is not only installed in physical devices on the cloud (e.g., servers, storage devices, etc.), but also on virtual resources (e.g., virtual machines—VMs that represent and function as physical servers) as well.

As depicted in block 410, log collection that complies with the configured MetaModel is then enabled (e.g., by the service automation manager 202, using the TLC 214, depicted in FIG. 2). That is, particular logs for a particular tenant/client/user are registered and monitored for logging operations to trace events that occur on the resources (hardware and software) on the cloud.

Note that the activities described in blocks 404-410 are "static configuration" activities, in that they are fixed for a particular tenant/user/client. As the cloud offering (e.g., service) executes, however, then a dynamic operation during "run time" occurs. That is, as depicted in block 412, for every instance/user/tenant/client of the cloud offering, logs from defined locations (resources) are pushed from the resource(s) (e.g., from resource pools 216 shown in FIG. 2) to a log (e.g., log 226 shown in FIG. 2). This log is thus made available at the tenant/user level (e.g., tenant client 206) in packages (cloud services) complying with the MetaModel (i.e., that have been configured appropriately by the MACSPL 224 described in FIG. 2).

Figure 5:
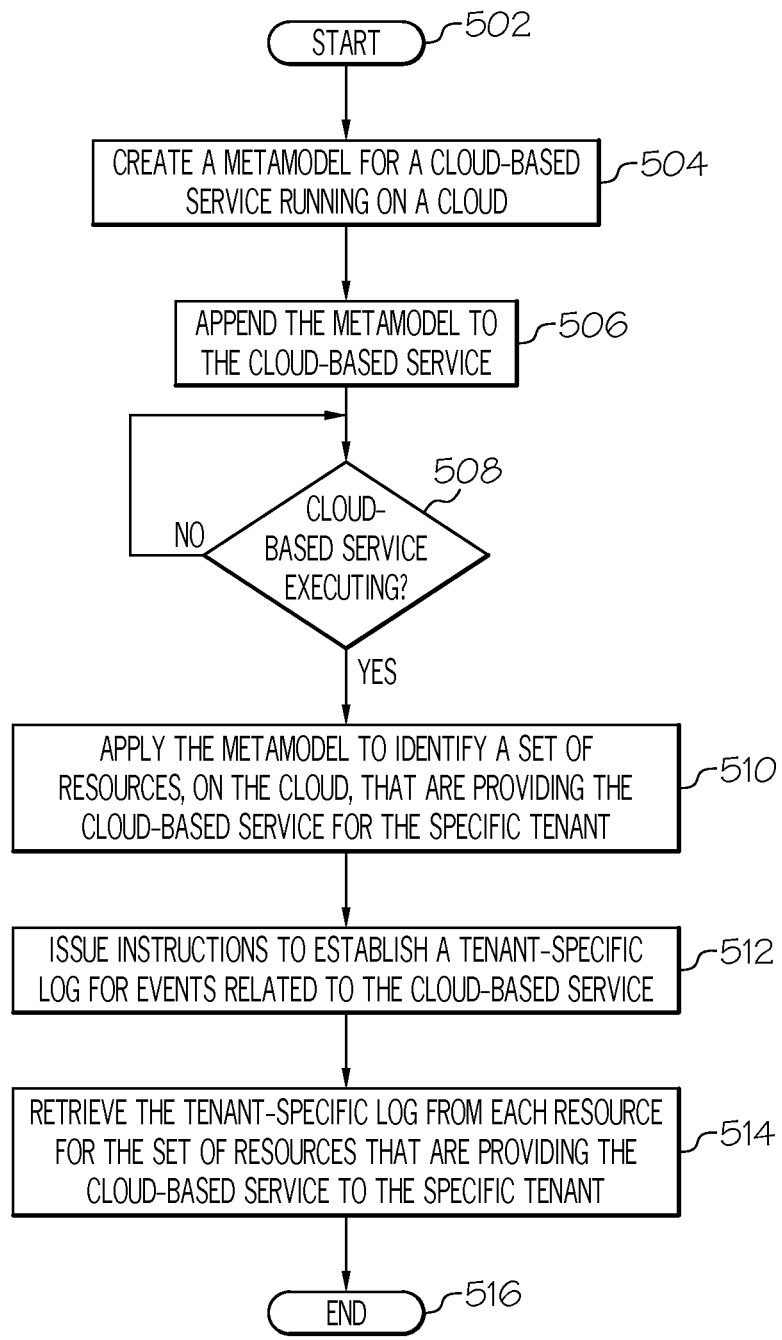
FIG. 5 is a high level flow-chart of one or more operations performed by one or more processors to establish and/or utilize a tenant-specific log for events related to a cloud-based service.

With reference now to FIG. 5, a high level flow-chart of one or more operations performed by one or more processors to establish and/or utilize a tenant-specific log for events related to a cloud-based service is presented.

After initiator block 502, a metamodel for a cloud-based service running on a cloud is created (block 504). The cloud-based service (e.g., cloud product offering 208 shown in FIG. 2) is provided to a specific tenant (e.g., tenant client 206 in FIG. 2) of the cloud. In one embodiment, the metamodel (i.e., the MetaModel described above) describes types of resources, on the cloud, that are providing the cloud-based service for the specific tenant and that the specific tenant desires to monitor. In another embodiment, the metamodel is simply for a particular tenant, but can be applied to various different services, cloud-based or otherwise, that are to be monitored/tracked/logged for hardware and/or software events.

As described in block 506, the metamodel is then appended to the cloud-based service. That is, the metamodel is associated with the cloud-based service, such that the metamodel follows the cloud-based service wherever it is run. In another embodiment, the metamodel is appended to the resources themselves (either hardware or software) that are used when implementing the cloud-based service.

As described in query block 508, a query is then made as to whether the cloud-based service is executing. If not, then the ecosystem (e.g., cloud on which the cloud-based service is implemented) continues to be monitored for execution of the cloud-based service. If so, however, then the metamodel is applied to identify a set of resources, on the cloud, that are providing the cloud-based service for the specific tenant. That is, the metamodel describes what types of resources are being used to provide the cloud-based service. These types are then used to identify specific resources that are being used to implement the cloud-based service.

As described in block 512, processor(s) then issue instructions to establish a tenant-specific log (e.g., log 226 in FIG. 2) for events related to the cloud-based service. This tenant-specific log tracks events that occur on each actual resource (i.e., each resource that actually exists) from the set of resources, on the cloud, that are providing the cloud-based service to the specific tenant. As described herein, these events are detected by agents (e.g., agent 220 shown in FIG. 2) that monitor hardware and/or software resources on the cloud that are being used to implement the cloud product offering for the particular tenant/client/user. Events include both abnormal events (e.g., excessive page swaps, overloading of processor/network resources, overheating of a device, security intrusions of a resource by an unauthorized party, etc.) as well as nominal events (e.g., proper execution of a certain section of code, properly storing data in a specific hard drive, etc.).

As described in block 514, processor(s) then retrieve the tenant-specific log for each actual resource from the set of resources, on the cloud, that are providing the cloud-based service to the specific tenant. The flowchart ends at terminator block 516.

In one embodiment of the present invention, the method further comprises, in response to detecting that a function of the cloud-based service has moved from a first resource on the cloud to a second resource on the cloud, deleting the tenant-specific log from the first resource and installing the tenant-specific log on the second resource. That is, in one embodiment, the tenant-specific log is not maintained on the service automation manager 202 shown in FIG. 2, but rather a version of the tenant-specific log is stored local to each actual resource. Thus, each actual resource shown in resource pools 216 in FIG. 2 has its own tenant-specific log. However, if one of the resources is taken off line, such that operations are transferred to another resource, then the tenant-specific log that was on the (now off line) original resource (e.g., a server) is moved to the new/replacement resource. This allows the service automation manager 202 to maintain a continuous log of operations for that type of resource, even when the resource itself is swapped out.

In one embodiment of the present invention, the method further comprises, in response to appending the metamodel to the cloud-based service, disabling any default log capabilities of the cloud-based service. That is, many resources have their own generic/default logging system. The present invention, however, establishes a tenant-specific logging system, which reduces unnecessary logging operations. In order to maximize this efficiency, any legacy/default logging systems within the resources are disabled, thus reducing unnecessary logging operations.

In one embodiment of the present invention, the tenant-specific log identifies a specific unit of hardware (e.g., server 218 shown in FIG. 2) being used to provide the cloud-based service to the specific tenant. In this embodiment, the method further comprises, in response to the tenant-specific log recording access to the specific unit of hardware by a predefined party, transferring operations related to the cloud-based service from the specific unit of hardware to another unit of hardware. For example, assume that server 218 shown in FIG. 2 is performing computational operations for the cloud product offering 208. Assume further that "malevolent user X" (i.e., an unauthorized user, a known adversary, a known business rival, etc.) has attempted to utilize server 218. Even if such access were proper and authorized, the tenant client 206 may not be comfortable with sharing the same server 218 resource with this party. Thus, if the tenant-specific log detects this usage, the current cloud product offering 208 for the tenant client 206 will no longer use this server 218, and will transfer operations to another server within the resource pools 216. In another embodiment, however, the operations are transferred to a non-cloud resource (e.g., a local server used only by the tenant client 206), thus ensuring that operations taken away from server 218 cannot be traced to another resource within resource pools 216 that may be accessible to "malevolent user X".

With reference again to FIG. 2, note that event log interface 212 is accessible to the tenant client 206 in one or more embodiments of the present invention, thus allowing the tenant client 206 to control which resources are used. For example, assume that user 1/Tenant 1 (i.e., tenant client 206, who is "user 1" of "Tenant 1" of the cloud) is presented a particular log/event result by clicking button 228. In one embodiment, the log, and/or an analysis of the log by the service automation manager 202, is presented by the user clicking button 228. Assume further that the log and/or analysis indicates, to the user, that the event is not a problem (i.e., does not pose a risk to the cloud-based offering 208 being compromised, the cloud-based offering 208 is operating as expected, etc.). In this case, the user will click button 230, indicating to the service automation manager 202 that the particular resource is to continue to be used.

However, another user may view the log/analysis for the same resource (or alternatively the first user may view the log/analysis for another resource) by clicking button 232. Assume now that this log/analysis indicates that using this resource will pose a problem, such as a security exposure, inefficient processing, etc. In this scenario, the user can click button 234, thus taking this resource off the cloud product offering 208 and its implementation.

In one embodiment of the present invention, the tenant-specific log identifies a physical location of a resource used to provide the cloud-based service. As such, there may be certain physical locations that pose certain legal, ethical, and/or security issues. For example, certain countries have regulations that restrict what types of data may be stored in a cloud. If the cloud product offering 208 in FIG. 2 is designed to store such data, then the system will, upon establishing an impermissible physical location that the cloud-based service is not permitted to operate within, move execution of the cloud-based service from a first resource on the cloud to a second resource that is outside the impermissible physical location.

Similarly, assume that a user works for "Enterprise A", and the tenant-specific log shows that data for "Enterprise A" is being stored on a device that belongs to competitor "Enterprise B" at a certain physical location (e.g., building) known to be owned by "Enterprise B". Enterprise A will not be comfortable with its data being stored on a device owned by its competitor, and so this data will be moved to another physical location.

In one embodiment of the present invention, the cloud-based service stores data for the specific tenant on a first storage device on the cloud. In this embodiment, in response to determining, from the tenant-specific log, that data for the specific tenant has been stored on the first storage device on the cloud for longer than a predefined length of time, instructions are issued to move the data for the specific tenant from the first storage device on the cloud to a second storage device. That is, assume that resource/server 218 shown in FIG. 2 is actually a disk drive for storing data. Tenant client 206 may have a concern that the longer data stays in one location, the more likely that it will be located by a nefarious party. However, by frequently moving this data from location to location, then there is less likelihood that it can be located and identified by the nefarious party.

In one embodiment of the present invention, the cloud-based service executes computer software instructions from an application on a first processing device on the cloud, and the computer software instructions are executed for the specific tenant of the cloud. In this embodiment, a determination is made, from the tenant-specific log, of an average length of time used by the first processing device on the cloud to execute the computer software instructions from the application for the specific tenant of the cloud. In response to determining that the average length of time exceeds a predetermined limit, instructions are issued to move execution of the computer software instructions from the first processing device on the cloud to a second processing device. For example, assume that service automation manager 202 determines that 100 lines of code take twice as long to execute on server 218 (shown in FIG. 2) than expected. Service automation manager 202 thus determines, based on the log for server 218, that server 218 is having problems, and moves the software execution operations to another server within the resource pools 216.

As described herein, the present invention provides a new and useful process and system for a tenant-specific log that allows a user to analyze and respond to resource usage on a cloud. In one or more embodiments, the present invention utilizes fewer resources than known logging systems, in that the logs described herein are tailored to the activities and operations of the specific tenant client 206 and/or cloud product offering 208 shown in FIG. 2.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method to establish and utilize a tenant-specific log for events related to a cloud-based service, the method comprising:
    creating, by one or more processors, a metamodel for a cloud-based service running on a cloud, wherein the cloud-based service is provided to a specific tenant of the cloud, and wherein the metamodel describes types of resources, on the cloud, that are providing the cloud-based service for the specific tenant and that the specific tenant desires to monitor;
    appending, by one or more processors, the metamodel to the cloud-based service;
    in response to the cloud-based service being executed for the specific tenant of the cloud, applying, by one or more processors, the metamodel to identify a set of resources, on the cloud, that are providing the cloud-based service for the specific tenant;
    issuing, by one or more processors, instructions to establish a tenant-specific log for events related to the cloud-based service, wherein the tenant-specific log tracks events that occur on each actual resource from the set of resources, on the cloud, that are providing the cloud-based service to the specific tenant, and wherein the tenant-specific log identifies a specific unit of hardware being used to provide the cloud-based service to the specific tenant;
    in response to the tenant-specific log recording access to the specific unit of hardware by a predefined party, transferring, by one or more processors, all operations related to the cloud-based service from the specific unit of hardware to another unit of hardware, wherein the predefined party is an authorized user of the specific unit of hardware, and wherein said another unit of hardware is a local device that is available only to the specific tenant; and
    retrieving, by one or more processors, the tenant-specific log for each actual resource from the set of resources, on the cloud, that are providing the cloud-based service to the specific tenant.

2. The method of claim 1, further comprising:
    in response to detecting that a function of the cloud-based service has moved from a first resource on the cloud to a second resource on the cloud, deleting, by one or more processors, the tenant-specific log from the first resource and installing the tenant-specific log on the second resource.

3. The method of claim 1, further comprising:
    in response to said appending the metamodel to the cloud-based service, disabling, by one or more processors, any default log capabilities of the cloud-based service.

4. The method of claim 1, wherein the tenant-specific log tracks identifications of users who are accessing the cloud-based service, and wherein the method further comprises:
    in response to detecting that an unauthorized user has accessed the cloud-based service, moving, by one or more processors, execution of the cloud-based service from a first resource on the cloud to a second resource on the cloud.

5. The method of claim 1, wherein the tenant-specific log tracks identifications of users who are accessing the cloud-based service, and wherein the method further comprises:
    in response to detecting that an unauthorized user has accessed the cloud-based service, moving, by one or more processors, execution of the cloud-based service from a first resource on the cloud to a second resource that is not on the cloud, wherein the second resource is owned by a client of the specific tenant.

6. The method of claim 1, wherein the tenant-specific log identifies a physical location of a resource used to provide the cloud-based service, and wherein the method further comprises:
  establishing, by one or more processors, an impermissible physical location that the cloud-based service is not permitted to operate within, wherein the impermissible physical location is a first country within which first country regulations do not permit the cloud-based service to operate; and
  in response to detecting that the physical location of a first resource on the cloud used to provide the cloud-based service is within the impermissible physical location, moving, by one or more processors, execution of the cloud-based service from the first resource on the cloud to a second resource that is outside the impermissible physical location, wherein outside the impermissible physical location is a second country within which second country regulations permit the cloud-based service to operate.

7. The method of claim 1, wherein the tenant-specific log identifies an owner of a resource used to provide the cloud-based service, and wherein the method further comprises:
  defining, by one or more processors, impermissible resources that the cloud-based service is not permitted to utilize, wherein the impermissible resources are owned by an impermissible owner; and
  in response to detecting that a resource used to provide the cloud-based service is an impermissible resource that is owned by the impermissible owner, moving, by one or more processors, execution of the cloud-based service from the impermissible resource to another resource.

8. The method of claim 1, wherein the cloud-based service stores data for the specific tenant on a first storage device on the cloud, and wherein the method further comprises:
  in response to determining, from the tenant-specific log, that data for the specific tenant has been stored on the first storage device on the cloud for longer than a predefined length of time, issuing, by one or more processors, instructions to move the data for the specific tenant from the first storage device on the cloud to a second storage device.

9. The method of claim 1, wherein the cloud-based service executes computer software instructions from an application on a first processing device on the cloud, wherein the computer software instructions are executed for the specific tenant of the cloud, and wherein the method further comprises:
  determining, by one or more processors and from the tenant-specific log, an average length of time used by the first processing device on the cloud to execute the computer software instructions from the application for the specific tenant of the cloud; and
  in response to determining that the average length of time exceeds a predetermined limit, issuing, by one or more processors, instructions to move execution of the computer software instructions from the first processing device on the cloud to a second processing device.

10. The method of claim 1, further comprising:
  appending, by one or more processors, the metamodel to resources from the set of resources that are providing the cloud-based service for the specific tenant.

11. The method of claim 1, further comprising:
  launching, by one or more processors, a single tenant log collector (TLC) for all cloud products utilized by the specific tenant of the cloud, wherein a tenant log collector collects tenant-specific logs of cloud resources used by the specific tenant.

12. The method of claim 1, further comprising:
  launching, by one or more processors, a different tenant log collector (TLC) for each particular cloud product utilized by the specific tenant of the cloud, wherein a tenant log collector collects tenant-specific logs of cloud resources used by the specific tenant.

13. A computer program product for establishing and utilizing a tenant-specific log for events related to a cloud-based service, the computer program product comprising a computer readable storage medium having program code embodied therewith, wherein the computer readable storage medium is not a transitory signal per se, and wherein the program code is readable and executable by a processor to perform a method comprising:
  creating a metamodel for a cloud-based service running on a cloud, wherein the cloud-based service is provided to a specific tenant of the cloud, and wherein the metamodel describes types of resources, on the cloud, that are providing the cloud-based service for the specific tenant and that the specific tenant desires to monitor;
  appending the metamodel to the cloud-based service;
  in response to the cloud-based service being executed for the specific tenant of the cloud, applying the metamodel to identify a set of resources, on the cloud, that are providing the cloud-based service for the specific tenant;
  issuing instructions to establish a tenant-specific log for events related to the cloud-based service, wherein the tenant-specific log tracks events that occur on each actual resource from the set of resources, on the cloud, that are providing the cloud-based service to the specific tenant, and wherein the tenant-specific log identifies a specific unit of hardware being used to provide the cloud-based service to the specific tenant;
  in response to the tenant-specific log recording access to the specific unit of hardware by a predefined party, transferring all operations related to the cloud-based service from the specific unit of hardware to another unit of hardware, wherein the predefined party is an authorized user of the specific unit of hardware, and wherein said another unit of hardware is a local device that is available only to the specific tenant; and
  retrieving the tenant-specific log for each actual resource from the set of resources, on the cloud, that are providing the cloud-based service to the specific tenant.

14. The computer program product of claim 13, wherein the method further comprises:
  in response to detecting that a function of the cloud-based service has moved from a first resource on the cloud to a second resource on the cloud, deleting the tenant-specific log from the first resource and installing the tenant-specific log on the second resource.

15. The computer program product of claim 13, wherein the method further comprises:
  in response to said appending the metamodel to the cloud-based service, disabling any default log capabilities of the cloud-based service.

16. The computer program product of claim 13, wherein the tenant-specific log identifies a physical location of a resource used to provide the cloud-based service, and wherein the method further comprises:
  establishing an impermissible physical location that the cloud-based service is not permitted to operate within; and
  in response to detecting that the physical location of a first resource on the cloud used to provide the cloud-based service is within the impermissible physical location, moving execution of the cloud-based service from the first resource on the cloud to a second resource that is outside the impermissible physical location.

17. A computer system comprising:
  a hardware processor, a computer readable memory, and a computer readable storage medium;
  first program instructions to create a metamodel for a cloud-based service running on a cloud, wherein the cloud-based service is provided to a specific tenant of the cloud, and wherein the metamodel describes types of resources, on the cloud, that are providing the cloud-based service for the specific tenant and that the specific tenant desires to monitor;
  second program instructions to append the metamodel to the cloud-based service;
  third program instructions to, in response to the cloud-based service being executed for the specific tenant of the cloud, apply the metamodel to identify a set of resources, on the cloud, that are providing the cloud-based service for the specific tenant;
  fourth program instructions to issue instructions to establish a tenant-specific log for events related to the cloud-based service, wherein the tenant-specific log tracks events that occur on each actual resource from the set of resources, on the cloud, that are providing the cloud-based service to the specific tenant, and wherein the tenant-specific log identifies a specific unit of hardware being used to provide the cloud-based service to the specific tenant;
  fifth program instructions to, in response to the tenant-specific log recording access to the specific unit of hardware by a predefined party, transfer all operations related to the cloud-based service from the specific unit of hardware to another unit of hardware, wherein the predefined party is an authorized user of the specific unit of hardware, and wherein said another unit of hardware is a local device that is available only to the specific tenant; and
  sixth program instructions to retrieve the tenant-specific log for each actual resource from the set of resources, on the cloud, that are providing the cloud-based service to the specific tenant; and wherein
the first, second, third, fourth, fifth, and sixth program instructions are stored on the computer readable storage medium and executed by the processor via the computer readable memory.

18. The computer system of claim 17, further comprising:
  seventh program instructions to, in response to detecting that a function of the cloud-based service has moved from a first resource on the cloud to a second resource on the cloud, delete the tenant-specific log from the first resource and install the tenant-specific log on the second resource; and wherein
the seventh program instructions are stored on the computer readable storage medium and executed by the processor via the computer readable memory.

* * * * *